(12) United States Patent
Mankame et al.

(10) Patent No.: US 11,975,643 B2
(45) Date of Patent: May 7, 2024

(54) SEAT UPPER ARM SUPPORTS

(71) Applicant: GM Global Technology Operations LLC, Detroit, MI (US)

(72) Inventors: Nilesh D Mankame, Ann Arbor, MI (US); Chin-hsu Lin, Troy, MI (US); Paul W Alexander, Ypsilanti, MI (US); Wonhee Michael Kim, Royal Oak, MI (US); Manuel Forero Rueda, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 17/725,878

(22) Filed: Apr. 21, 2022

(65) Prior Publication Data
US 2023/0339375 A1   Oct. 26, 2023

(51) Int. Cl.
*B60N 2/75* (2018.01)

(52) U.S. Cl.
CPC ........................................ *B60N 2/75* (2018.02)

(58) Field of Classification Search
None
See application file for complete search history.

(56) References Cited

U.S. PATENT DOCUMENTS

| | | | | |
|---|---|---|---|---|
| 3,214,117 A | * | 10/1965 | James | B64D 25/02 297/452.56 |
| 4,081,156 A | * | 3/1978 | Ideskar | B64D 25/02 244/122 AG |
| 4,215,835 A | * | 8/1980 | Wedgwood | B64D 25/02 244/122 AG |
| 4,359,200 A | * | 11/1982 | Brevard | B64D 25/02 244/122 AG |
| 4,592,523 A | * | 6/1986 | Herndon | B64D 25/02 297/216.12 |
| 4,787,677 A | * | 11/1988 | Reighter | B60R 22/14 224/159 |
| 5,112,081 A | * | 5/1992 | Kesseru | B60R 22/14 296/96 |
| 5,415,366 A | * | 5/1995 | Mastrolia | B64D 25/02 244/122 AG |
| 5,464,246 A | * | 11/1995 | Castro | D04C 1/06 244/122 AG |
| 5,730,498 A | * | 3/1998 | Hanson | B60R 22/14 297/484 |
| 5,806,923 A | * | 9/1998 | Tschaschke | B60N 2/4249 297/216.13 |
| 6,616,242 B1 | * | 9/2003 | Stoll | B60N 2/2812 297/484 |

(Continued)

FOREIGN PATENT DOCUMENTS

| | | | | |
|---|---|---|---|---|
| CA | 2692423 A1 | * | 1/2008 | ............... B60N 2/28 |
| DE | 2547186 A1 | * | 4/1977 | |

*Primary Examiner* — David E Allred
(74) *Attorney, Agent, or Firm* — Vivacqua Crane, PLLC

(57) ABSTRACT

A vehicle seat includes a seat cushion, a seat back pivotally moveable between an upright position and a reclined position, and at least one upper arm support selectively moveable between a stowed position and an extended position, the at least one upper arm support adapted to provide support for an upper arm of an occupant when the seat back of the vehicle seat is in the reclined position and the at least one upper arm support is in the extended position.

7 Claims, 7 Drawing Sheets

(56) References Cited

U.S. PATENT DOCUMENTS

| | | | | |
|---|---|---|---|---|
| 7,625,048 B2* | 12/2009 | Rouhana | ............... | B60R 22/02 |
| | | | | 297/484 |
| 7,703,803 B2* | 4/2010 | Ekberg | ............... | B60R 21/06 |
| | | | | 5/429 |
| 9,238,425 B2* | 1/2016 | Fukawatase | ............... | B60R 21/013 |
| 10,633,100 B2* | 4/2020 | Adams | ............... | B64D 25/10 |
| 10,807,551 B2* | 10/2020 | Deng | ............... | B60N 2/427 |
| 11,305,880 B2* | 4/2022 | Holstine | ............... | B64D 11/062 |
| 11,338,925 B2* | 5/2022 | Bharucha | ............... | B64D 25/10 |
| 11,597,525 B2* | 3/2023 | Teal | ............... | B64D 25/06 |
| 2005/0236209 A1* | 10/2005 | Chernoff | ............... | B60R 21/01552 |
| | | | | 280/801.1 |
| 2007/0040441 A1* | 2/2007 | Boyle | ............... | B60N 2/2806 |
| | | | | 297/467 |
| 2009/0200818 A1* | 8/2009 | Giesa | ............... | B64D 11/0641 |
| | | | | 24/593.1 |
| 2009/0230741 A1* | 9/2009 | Aaron | ............... | B60R 22/105 |
| | | | | 224/160 |
| 2020/0070704 A1* | 3/2020 | Viano | ............... | B60N 2/99 |
| 2020/0331421 A1* | 10/2020 | Saito | ............... | B60N 2/42 |

* cited by examiner

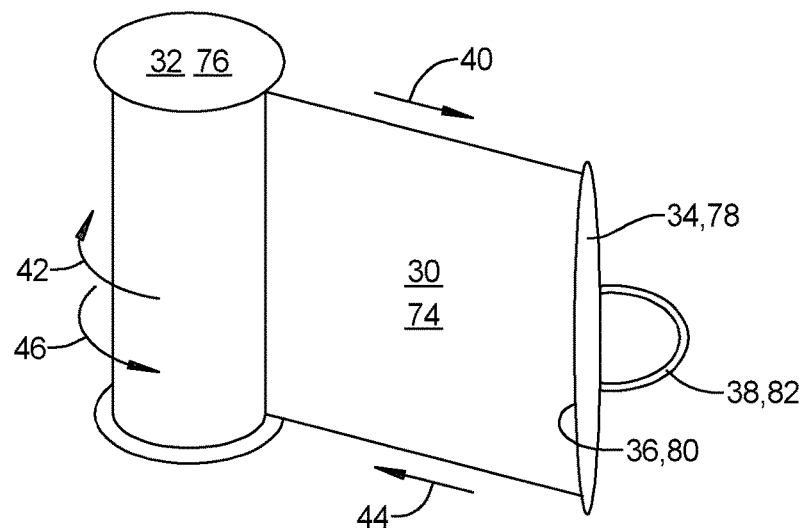
FIG. 5
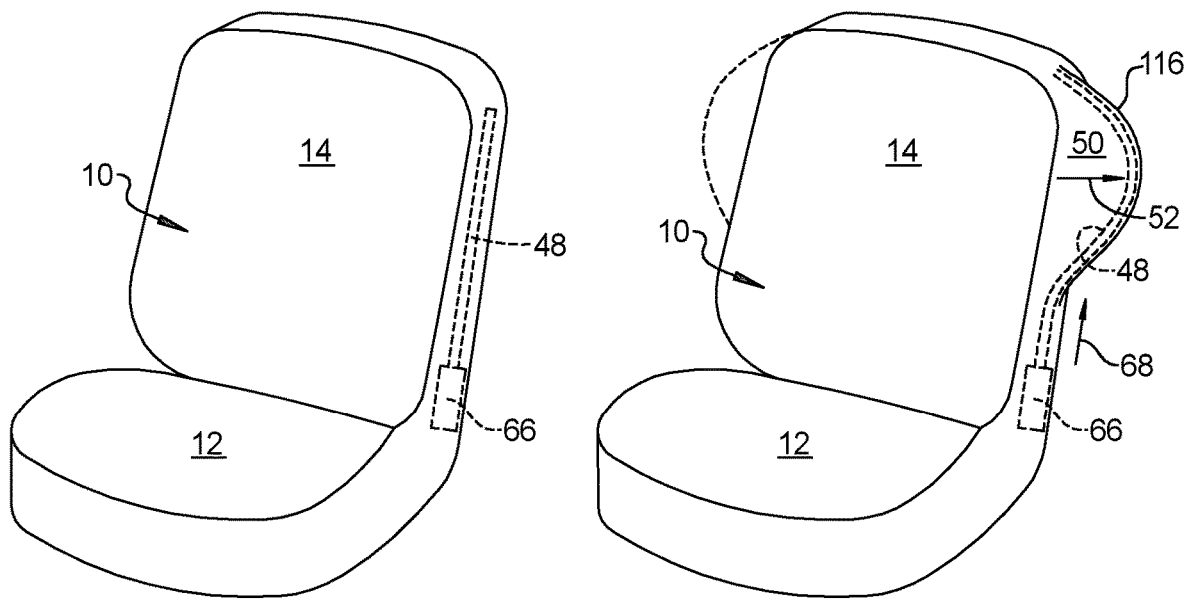
FIG. 6
FIG. 7

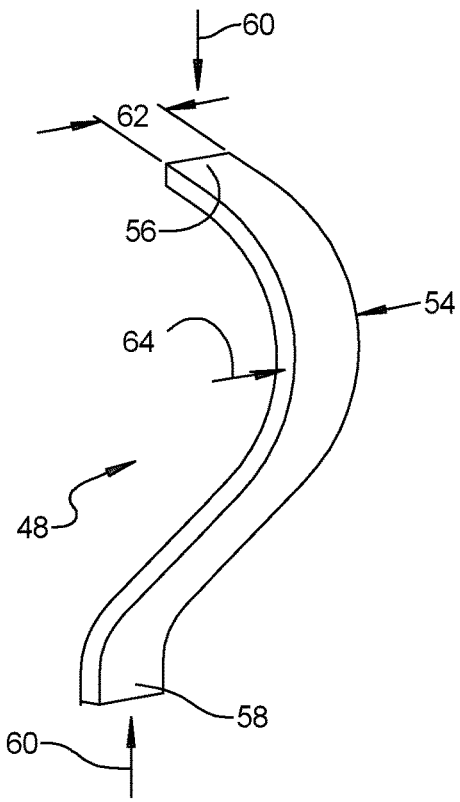
FIG. 8
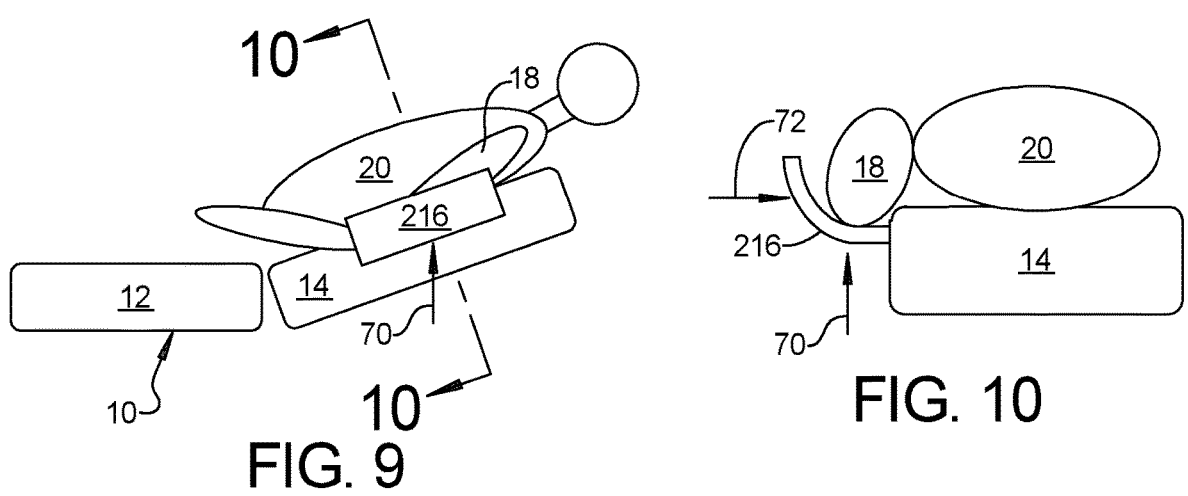
FIG. 9
FIG. 10

SEAT UPPER ARM SUPPORTS

INTRODUCTION

The present disclosure relates to a seat having upper arm supports for providing support to the upper arms of an occupant when the seat is reclined to a recumbent position.

Armrests in automotive vehicles were once considered to be a synonym of luxury. Today, armrests are standard equipment in almost all vehicles. Modern vehicle armrests not only provide comfort for the driver but also offer a wide variety of features related to the operation of a car. Armrests for vehicle seats primarily provide increased driver comfort. An armrest offers the possibility of comfortably positioning your hand when driving on a motorway or standing in traffic. Depending on the equipment of an individual vehicle, it can also combine the functions of the control console of the vehicle's electrical systems and the practical storage compartment. Vehicle armrests are manufactured from a variety of materials, to provide comfort of use, durability, stability and safety.

A front armrest ensures comfortable steering. Owing to the possibility of resting a hand freely, it ensures stable support and a favorable posture. The advantages of vehicle armrests are particularly notable when driving on a long trip, when standing in traffic or when driving very slowly, as it allows the driver to relax his/her hand and forearm muscles.

Traditional vehicle armrests provide support for the hand and/or forearm of an occupant within the vehicle. Modern vehicles include seats that recline to allow an occupant to sit in a recumbent posture. This offers advantages for passengers within the vehicle on a long trip, wherein the passengers may recline the seat to relax or sleep. With autonomous vehicles, this feature may be useful for all passengers within the vehicle. When a vehicle seat is reclined, and the occupant is seated in a recumbent position, traditional armrests that are adapted to provide support for the hand/forearm, do not provide support for the upper arm of an occupant. Thus, in traditional vehicle seats, when the seat is reclined, the upper arms of the occupants are free to fall to the side of the vehicle seat.

Thus, while current vehicle seats having armrests achieve their intended purpose, there is a need for a new and improved upper arm support for a vehicle seat that will provide support to the upper arms of an occupant that is seated within a reclined vehicle seat.

SUMMARY

According to several aspects, a vehicle seat, in accordance with the present disclosure includes a seat cushion, a seat back pivotally moveable between an upright position and a reclined position, and at least one upper arm support selectively moveable between a stowed position and an extended position, the at least one upper arm support adapted to provide support for an upper arm of an occupant when the seat back of the vehicle seat is in the reclined position and the at least one upper arm support is in the extended position.

According to another aspect, the at least one upper arm support is mounted onto the seat back and is adapted to extend, from the stowed position, laterally outward from the seat back, to the extended position, to provide vertical support for the upper arm of the occupant when the seat back of the vehicle seat is in the reclined position.

According to another aspect, the at least one upper arm support includes a first upper arm support positioned on the seat back on a first side of the vehicle seat and a second upper arm support positioned on the seat back on a second side of the vehicle seat.

According to another aspect, the at least one upper arm support includes a plate adapted to be pulled laterally outward from the stowed position to the extended position.

According to another aspect, the plate is compliant and adapted to roll up within the seat back when in the stowed position and includes a rigid member attached to a distal end thereof, the rigid member adapted to allow an occupant to pull the plate from the stowed position to the extended position.

According to another aspect, the at least one upper arm support includes a deformable support member positioned within the seat back and adapted to flex laterally outward to the extended position when deformed, the seat back including a stretchable covering such that when the support member flexes laterally outward to the extended position the covering of the seat back stretches laterally outward.

According to another aspect, the deformable support member includes a bow having a first end and a second end, wherein when the first end and the second end are forced toward one another the bow flexes laterally outward to the extended position, the bow having dimensions adapted to provide vertical support for the upper arm of the occupant when the bow is flexed outward to the extended position and the seat back of the vehicle seat is in the reclined position.

According to another aspect, the first end of the deformable support member is secured within the seat back, the vehicle seat further including a mechanical device secured within the seat back and adapted to force the second end of the deformable support member toward the first end of the deformable support member.

According to another aspect, the at least one upper arm support is further adapted to provide lateral support for the upper arm of the occupant when the seat back of the vehicle seat is in a reclined position and restrict movement of the upper arm of the occupant laterally away from the occupant.

According to another aspect, the at least one upper arm support includes a stretchable band adapted to recoil within the seat back onto a spool when in the stowed position and including a rigid member positioned at a distal end, the seat cushion including at least one attachment point, the rigid member adapted to be secured to the at least one attachment point when the at least one upper arm support is pulled to the extended position.

According to another aspect, the spool is adapted to allow the stretchable band to be selectively pulled from the seat back to the extended position and to prevent further extension of the stretchable band during a collision event.

According to another aspect, the at least one upper arm support extends from the seat back on a first side of the vehicle seat, and the attachment point is positioned on the seat cushion on a second side of the vehicle seat, wherein when in the extended position, the stretchable band extends across an occupant seated therein.

According to another aspect, the at least one upper arm support extends from the seat back on a first side of the vehicle seat, and the attachment point is positioned on a top surface of the seat cushion, wherein when in the extended position, the stretchable band extends partially across an occupant seated therein.

According to another aspect, the at least one upper arm support includes a first bladder, and a plurality of architectural tiles positioned adjacent one another within the first bladder, wherein, when atmospheric pressure is present within the first bladder, the at least one upper arm support is biased to the stowed position flat against the seat back, and when negative pressure is applied to the first bladder, the architectural tiles are forced into engagement with one another, and the at least one upper arm support is forced laterally outward to the extended position.

According to another aspect, the at least one upper arm support further includes a second bladder, wherein when positive pressure is applied within the second bladder, the second bladder biases the at least one upper arm support to the stowed position.

According to another aspect, each of the plurality of architectural tiles includes angled sidewalls, such that when the plurality of architectural tiles are forced into engagement with one another the at least one upper arm support takes a curved shape.

According to another aspect, the at least one upper arm support includes a first rigid end mounted to the seat back, a second rigid end, and an expandable bladder extending between the first and second rigid ends, wherein, when the at least one upper arm support is in the stowed position, no pressure is applied within the expandable bladder, and the expandable bladder is compressed between the first and second rigid ends, and when the at least one upper arm support is in the extended position, positive pressure is applied within the expandable bladder, expanding the expandable bladder and pushing the second rigid end laterally outward.

According to another aspect, the expandable bladder includes a first side wall and a second side wall, opposite the first side wall, the second side wall having a maximum length that is longer than the first side wall, such that when the expandable bladder is fully expanded, the at least one upper arm support is forced to curve forward to provide lateral support for the upper arm of the occupant when the seat back of the vehicle seat is in a reclined position and restrict movement of the upper arm of the occupant laterally away from the occupant.

According to another aspect, the expandable bladder includes a first elastic tether extending between the first and second rigid ends adjacent the first side wall and a second elastic tether extending between the first and second rigid ends adjacent the second side wall, the second elastic tether adapted to allow more expansion of the expandable bladder than the first elastic tether, such that when the expandable bladder is fully expanded, the at least one upper arm support is forced to curve forward to provide lateral support for the upper arm of the occupant when the seat back of the vehicle seat is in a reclined position and restrict movement of the upper arm of the occupant laterally away from the occupant.

According to another aspect, when no pressure is applied within the expandable bladder, the first and second elastic tethers are adapted to pull the second rigid end toward the first rigid end and compress the expandable bladder, bringing the at least one upper arm support to the stowed position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a perspective view of a spool for the embodiments shown in FIG. 3, FIG. 4, FIG. 11, FIG. 12 and FIG. 13;

FIG. 6 is a perspective view of a vehicle seat having upper arm supports that include a deformable support member, wherein the upper arm supports are in the stowed position;

FIG. 7 is a perspective view of the vehicle seat shown in FIG. 6, wherein the upper arm supports are in the extended position;

FIG. 8 is a perspective view of the deformable support member shown in FIG. 6 and FIG. 7;

FIG. 9 is a schematic diagram of a vehicle seat with an upper arm support adapted to provide vertical and lateral support for the upper arm of an occupant seated therein;

FIG. 10 is a sectional view taken along line 10-10 in FIG. 9;

Figure 1:
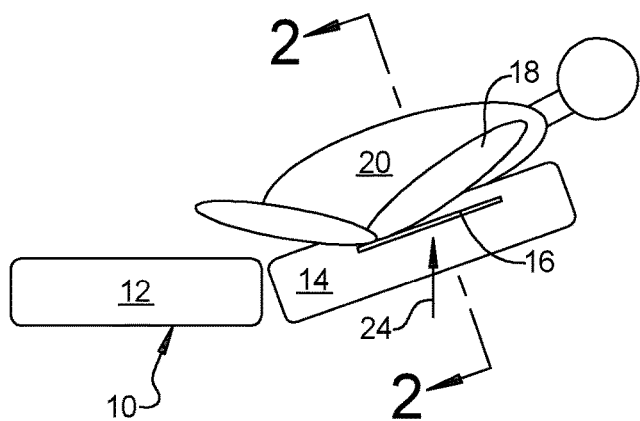
FIG. 1 is a schematic diagram of a vehicle seat with an occupant seated therein in accordance with the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components, as well as other reclined bedding/seating situations, such as hospitals and examination rooms, etc.

Figure 2:
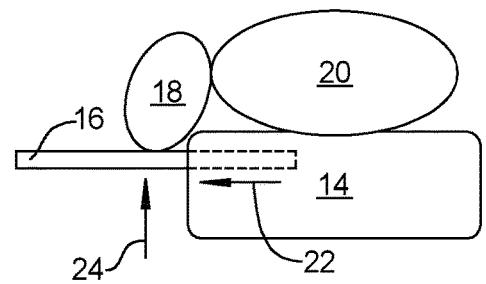
FIG. 2 is a sectional view taken along line 2-2 in FIG. 1.

Referring to FIG. 1, a vehicle seat 10 according to the present disclosure includes a seat cushion 12, a seat back 14 pivotally moveable between an upright position and a reclined position, and at least one upper arm support 16. Referring to FIG. 2, the at least one upper arm support 16 is selectively moveable between a stowed position, as shown in shadow, and an extended position. The at least one upper arm support 16 is adapted to provide support for an upper arm 18 of an occupant 20 when the seat back 14 of the vehicle seat 10 is in the reclined position and the at least one upper arm support 16 is in the extended position. The at least one upper arm support 16 is mounted onto the seat back 14 and is adapted to extend, from the stowed position, laterally outward from the seat back 14, as indicated by arrow 22, to the extended position, to provide vertical support for the upper arm 18 of the occupant 20 when the seat back 14 of the vehicle seat 10 is in the reclined position, as indicated by arrow 24.

In exemplary embodiments, the at least one upper arm support 16 comprises a single upper arm support 16 mounted onto one side of the seat back 14 of the vehicle seat 10. In other embodiments, the at least one upper arm support 16 includes a first upper arm support 16A positioned on the seat back 14 on a first side 26 of the vehicle seat 10 and a second upper arm support 16B positioned on the seat back 14 on a second side 28 of the vehicle seat 10. Both possibilities are presented in various embodiments described herein.

Figure 3:
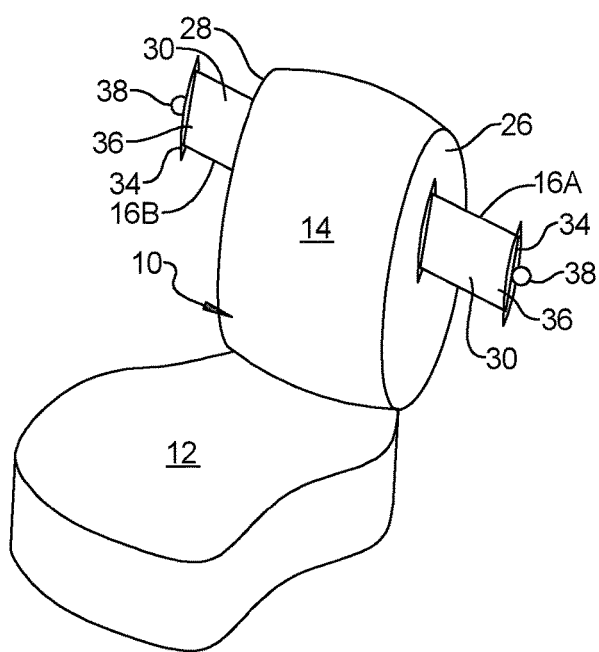
FIG. 3 is a perspective view of a vehicle seat having upper arm supports that include a retractable plate, wherein the upper arm supports are in the extended position.
Figure 4:
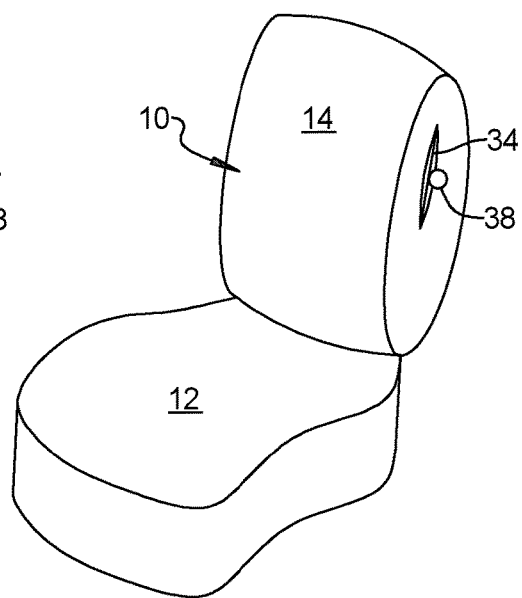
FIG. 4 is a perspective view of the vehicle seat shown in FIG. 3, wherein the upper arm supports are in the stowed position.

Referring to FIG. 3 and FIG. 4, in one exemplary embodiment, the at least one upper arm support 16 includes a plate 30 adapted to be pulled laterally outward from the stowed position, as shown in FIG. 3, to the extended position, as shown in FIG. 2. As shown, the vehicle seat 10 includes a first upper arm support 16A positioned on the seat back 14 on a first side 26 of the vehicle seat 10 and a second upper arm support 16B positioned on the seat back 14 on a second side 28 of the vehicle seat 10.

The plate 30 is compliant and adapted to roll up within the seat back 14 when in the stowed position, while still being rigid enough to provide vertical support for the upper arm 18 of the occupant 20. In one exemplary embodiment, the plate 30 is formed of spring steel that has a curved profile similar to that of a measuring tape blade. The plate 30 when extended out linearly, to the extended position, presents a curved profile that provides rigidity to the extended plate 30 such that the plate 30 provides support to the upper arm 18 of the occupant 20. When retracted to the stowed position, the curved profile of the plate 30 flattens, and the plate 30 coils onto a spool 32, as shown in FIG. 5.

The plate 30 includes a rigid member 34 attached to a distal end 36 thereof. The rigid member 34 is adapted to allow an occupant 20 to pull the plate 30 from the stowed position to the extended position. As shown, the rigid member 34 includes a finger loop 38 or some similar design feature, such as a knob or a scallop, to allow an occupant 20 to grasp and pull the plate 30. When the plate 30 is being pulled toward the extended position, as indicated by arrow 40, the plate 30 uncoils from the spool 32, as indicated by arrow 42. Likewise, when the plate 30 is retracting to the stowed position, as indicated by arrow 44, the plate 30 coils onto the spool 32, as indicated by arrow 46. In an exemplary embodiment, the spool 32 includes a spring-loaded coil/ratchet mechanism, similar to that of a seat belt, wherein, when the plate 30 is pulled outward to the extended position, and the occupant 20 releases the rigid member 34, the ratchet mechanism within the spool 32 holds the plate 30 in the extended position. When the occupant 20 wants to retract the plate 30 to the stowed position, a slight pull on the rigid member 34 releases the ratchet mechanism within the spool 32, wherein the spring-loaded spool 32 automatically coils the plate 30 thereon.

Referring to FIG. 6 and FIG. 7, in another exemplary embodiment, an at least one upper arm support 116 includes a deformable support member 48 positioned within the seat back 14 and adapted to flex laterally outward to the extended position when deformed. The seat back includes a stretchable covering 50 such that when the support member 48 flexes laterally outward to the extended position, as indicated by arrow 52, the covering 50 of the seat back 14 stretches laterally outward. When fully extended, the stretched covering 40 is pulled tight, thus providing a tensioned surface for support of the upper arm, and providing resistance to further movement of the support member 48, making the extended at least one upper arm support 116 rigid. Referring to FIG. 6, when in the stowed position, the support member 48 is relaxed within the seat back 14. Referring to FIG. 8, the deformable support member 48 includes a bow 54 having a first end 56 and a second end 58. When the first end 56 and the second end 58 are forced toward one another, as indicated by arrows 60, the bow 54 flexes laterally outward to the extended position. The bow 54 has dimensions 62 adapted to provide vertical support for the upper arm of the occupant 20, as indicated by arrow 64, when the bow 54 is flexed outward to the extended position and the seat back 14 of the vehicle seat 10 is in the reclined position. As shown in FIG. 8, in one exemplary embodiment, the bow has a generally ribbon shaped cross-section having a width 62, that provides vertical support for the upper arm of the occupant 20, as indicated by arrow 64. It should be understood by those skilled in the art, that other cross-sectional shapes of the bow may be used to provide vertical support for the upper arm of the occupant 20, without departing from the scope of the present disclosure.

In an exemplary embodiment, the first end 56 of the deformable support member 48 is secured within the seat back 14, and the vehicle seat 10 further includes a mechanical device 66 secured within the seat back 14. The mechanical device 66 is adapted to engage the second end 58 of the deformable support member 48 and force the second end 58 of the deformable support member 48 toward the first end 56 of the deformable support member 48, as indicated by arrow 68 in FIG. 7. In another embodiment, the second end 58 of the deformable support 48 is fixed, and the first end 56 is forced toward the second end 58. In still another embodiment, each of the first and second ends 56, 58 are moveable and can be forced toward one another simultaneously. It should be understood that any embodiment wherein the distance between the first and second ends 56, 58 is reduced to cause the bow 54 to flex outward is within the scope of the present disclosure.

Referring to FIG. 9 and FIG. 10, in still another exemplary embodiment, an at least one upper arm support 216 is further adapted to provide lateral support for the upper arm 18 of the occupant 20 when the seat back 14 of the vehicle seat 10 is in a reclined position and restrict movement of the upper arm 18 of the occupant 20 laterally away from the occupant 20. As shown generically in FIG. 9 and FIG. 10, the at least one upper arm support 216 includes features that provide vertical support for the upper arm 18 of the occupant 20 when the seat back 14 is in the reclined position, as indicated by arrow 70, and simultaneously, provides lateral support, as indicated by arrow 72, to keep the upper arm 18 of the occupant 20 from moving laterally away from the occupant 20.

Figure 11:
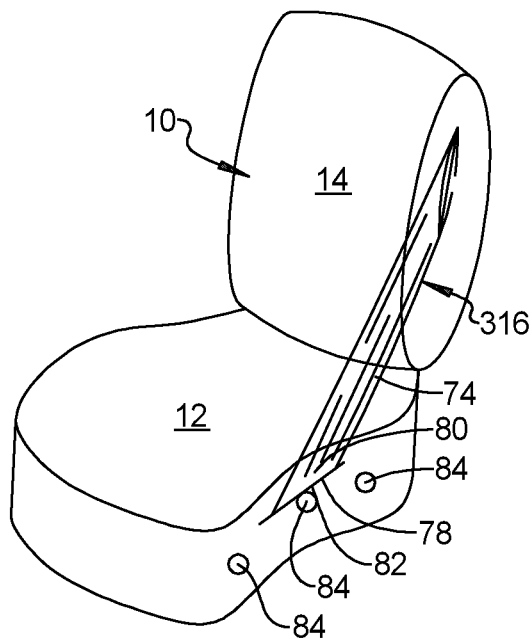
FIG. 11 is a perspective view of a vehicle seat having a stretchable band that extends from the seat back to attachment points on the seat cushion.

Referring to FIG. 11, in an exemplary embodiment, an at least one upper arm support 316 includes a stretchable band 74 adapted to recoil within the seat back 14 onto a spool 76 when in the stowed position, as shown in FIG. 4. In one example, the spool 76 comprises a spool 76, as shown in FIG. 5, that includes a spring-loaded coil/ratchet mechanism, similar to that of a seatbelt, wherein, when the stretchable band 74 is pulled outward to the extended position, as shown in FIG. 11, the ratchet mechanism within the spool 76 holds the stretchable band 74 in the extended position. When the occupant 20 wants to retract the stretchable band 74 to the stowed position, a slight pull releases the ratchet mechanism within the spool 76, wherein the spring-loaded spool 76 automatically coils the stretchable band 74 thereon.

The stretchable band 74 includes a rigid member 78 positioned at a distal end 80 that includes a finger loop 82, or a similar design feature. The seat cushion 12 includes at least one attachment point 84, the rigid member 78 is adapted to be secured to the at least one attachment point 84 when the at least one upper arm support 316 is pulled to the extended position. The at least one attachment point 84 is attached to and extends outward from an internal seat structure, through the seat cushion. As shown in FIG. 11, the seat cushion 12 includes three attachment points 84, the rigid member 78 of the stretchable band 74 being secured to a middle one of the three attachment points 84. Multiple attachment points 84 allows the stretchable band 74 to be attached to the seat cushion 12 at varying positions to accommodate occupants 20 of different size/weight and different occupant preferences. When in the extended position, the stretchable band 74 provides lateral support to keep the upper arm 18 of the occupant 20 from falling away from the occupant 20 when the seat back 14 is in the reclined position.

In an exemplary embodiment, the spool 76 is adapted to allow the stretchable band 74 to be selectively pulled from the seat back 14 to the extended position and to prevent further extension of the stretchable band 74 during a collision event. Much like a seatbelt, the spring-loaded coil/ratchet mechanism of the spool 76 will allow an occupant 20 to pull the stretchable band 74 from the spool 76, but during a collision event, sudden harsh pulling of the stretchable band 74 will cause the spool 76 to lock-up, preventing further uncoiling of the stretchable band 74. Thus, in a collision event, the stretchable band 74 will provide additional support during a collision event.

Figure 12:
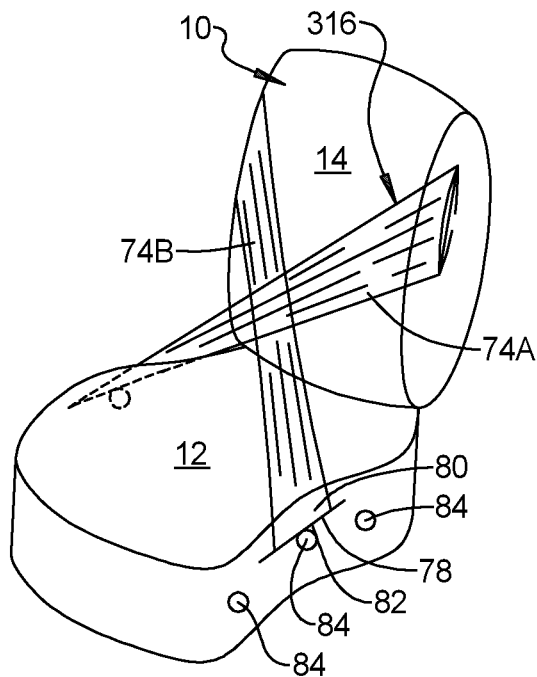
FIG. 12 is a perspective view of a vehicle seat having stretchable bands extending from both sides of the seat back to attachment points on opposite side of the seat cushion.

Referring to FIG. 12, in another exemplary embodiment, the at least one upper arm support 316 extends from the seat back 14 on a first side 26 of the vehicle seat 10, and the attachment point 84 is positioned on the seat cushion 12 on a second side 28 of the vehicle seat 10, wherein when in the extended position, the stretchable band 74 extends across an occupant 20 seated therein. In the embodiment shown in FIG. 12, the vehicle seat 10 includes a first stretchable band 74A extending from the seat back 14 on the first side 26 of the vehicle seat 10 and attached to an attachment point 84 located on the seat cushion 12 on the second side 28 of the vehicle seat 10, opposite the first side 26. The vehicle seat 10 further includes a second stretchable band 74B extending from the seat back 14 on the second side 28 of the vehicle seat 10 and attached to an attachment point 84 located on the seat cushion 12 on the first side 26 of the vehicle seat 10. The first and second stretchable bands 74A, 74B extend across the occupant 20 to envelope the occupant 20 therein. The first and second stretchable bands 74A, 74B are made from a resilient material that provides support while allowing the occupant 20 to move when enveloped therein.

Figure 13:
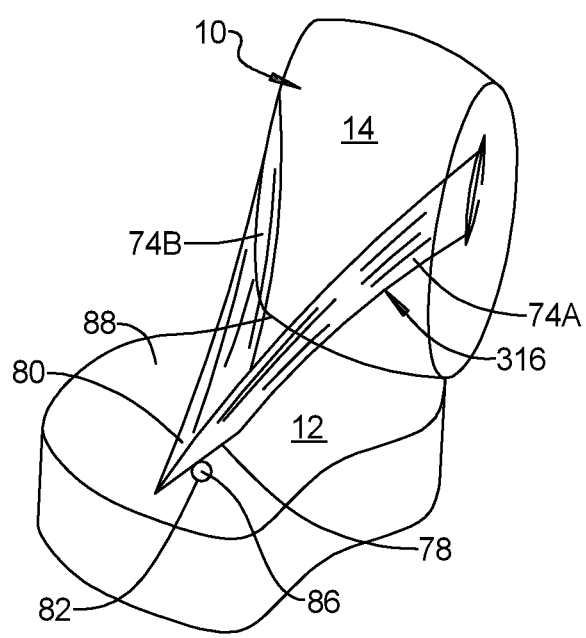
FIG. 13 is a perspective view of a vehicle seat having stretchable bands extending from both sides of the seat back to an attachment point extending from a top surface of the seat cushion near a center of the seat cushion.

Referring to FIG. 13, in another exemplary embodiment, the at least one upper arm support 316 extends from the seat back 14 on the first side 26 of the vehicle seat 10, and an attachment point 86 extends from a top surface 88 of the seat cushion 12, near a center of the seat cushion 12. The attachment point is secured to structural framework of the seat 10, and extends upward through the top surface of the seat cushion. When in the extended position, the stretchable band 74 extends partially across an occupant seated therein. In the embodiment shown in FIG. 13, the vehicle seat 10 includes a first stretchable band 74A extending from the seat back 14 on the first side 26 of the vehicle seat 10 and attached to the attachment point 86 located on the top surface 88 of the seat cushion 12, near a center of the seat cushion 12. The vehicle seat 10 further includes a second stretchable band 74B extending from the seat back 14 on the second side 28 of the vehicle seat 10 and attached to the same attachment point 86 on the top surface 88 of the seat cushion 12, which would be between the legs of the occupant 20. The first and second stretchable bands 74A, 74B extend from the first and second sides 26, 28 of the vehicle seat 10 and partially across the occupant 20 to partially envelope the occupant 20 therein. The first and second stretchable bands 74A, 74B are made from a resilient material that provides support while allowing the occupant 20 to move when enveloped therein.

In an exemplary embodiment, the stretchable bands 74, 74A, 74B are more stretchable in one direction than in another. For example, the stretchable bands 74, 74A, 74B are less stretchable in a lengthwise direction, thus providing sufficient restraint and support for the upper arm 18 of an occupant 20, however, the stretchable bands 74, 74A, 74B are more stretchable in a direction perpendicular to the length of the stretchable bands 74, 74A, 74B, to allow the stretchable bands 74, 74A, 74B to partially conform to and envelope the upper arm 18 of the occupant 20.

Figure 14:
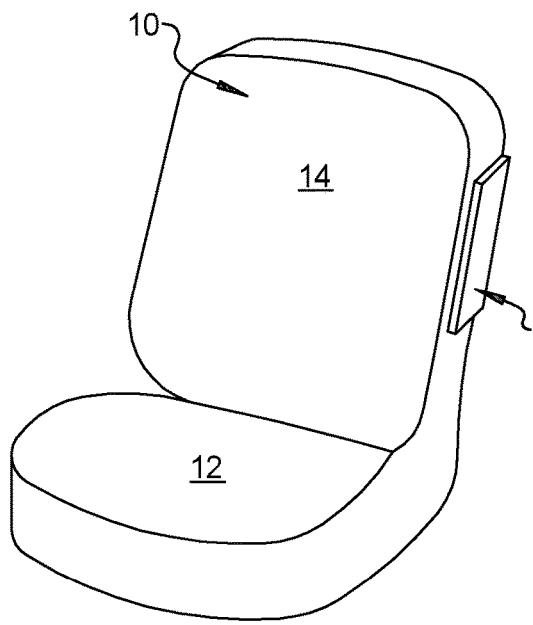
FIG. 14 is a perspective view of a vehicle seat having upper arm supports that includes a vacuum bladder with architectural tiles therein, wherein the upper arm support is in the stowed position.
Figure 15:
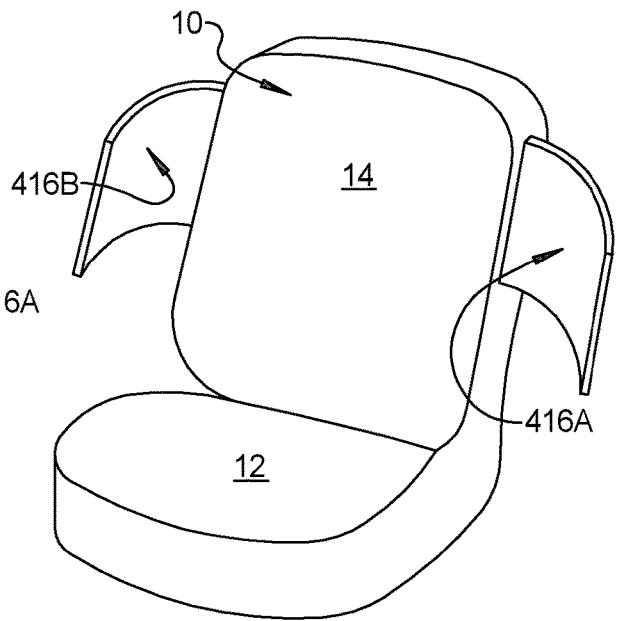
FIG. 15 is a perspective view of the vehicle seat shown in FIG. 14, wherein the upper arm supports are in the extended position.
Figure 16:
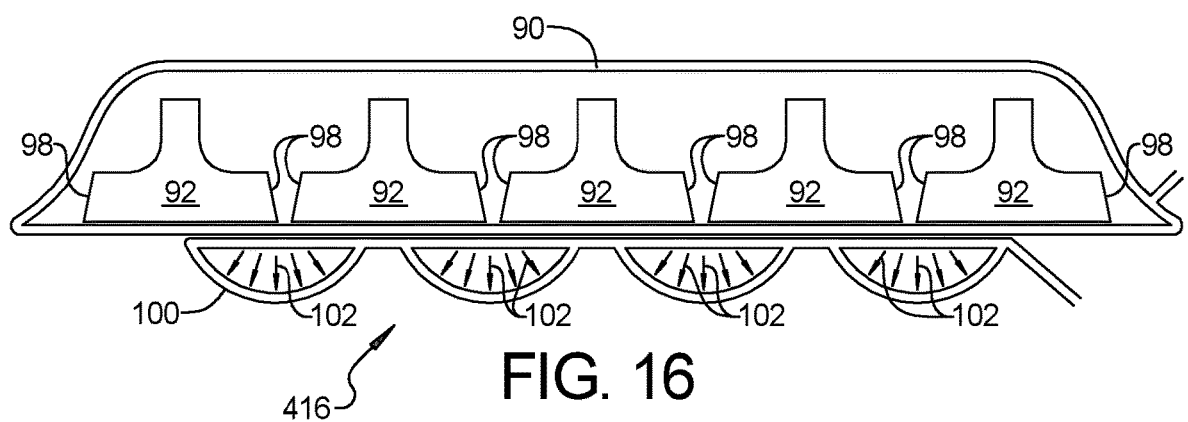
FIG. 16 is a sectional view of the upper arm supports shown in FIG. 14 and FIG. 15, when the upper arm supports are in the stowed position.
Figure 17:
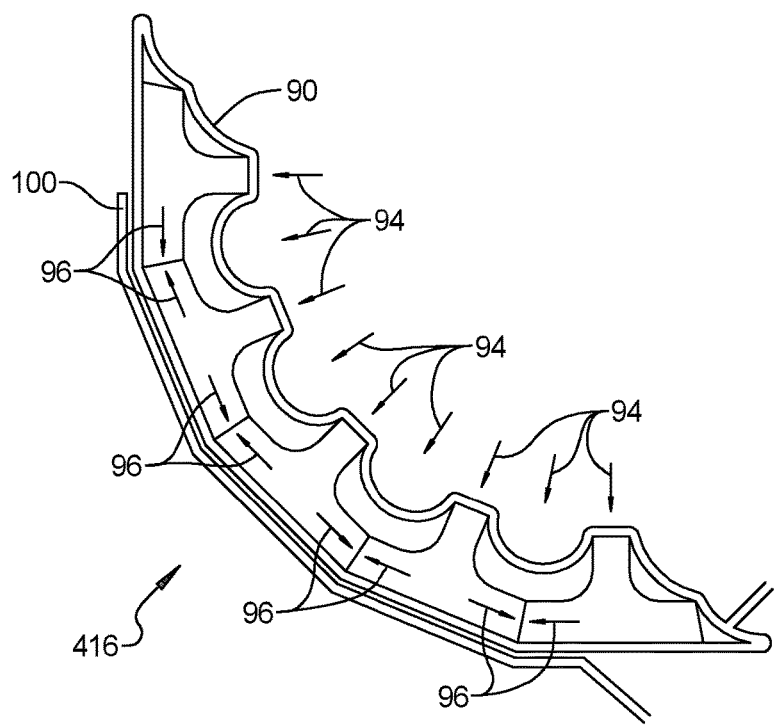
FIG. 17 is a sectional view of the upper arm supports shown in FIG. 14 and FIG. 15, when the upper arm supports are in the extended position.

Referring to FIG. 14, FIG. 15, FIG. 16 and FIG. 17, in another exemplary embodiment, an at least one upper arm support 416 includes a first bladder 90, and a plurality of architectural tiles 92 positioned adjacent one another within the first vacuum bladder 90. As shown, the vehicle seat 10 includes a first upper arm support 416A extending from the seat back 14 on the first side 26 of the vehicle seat 10, and a second upper arm support 416B extending from the seat back 14 on the second side 28 of the vehicle seat 10. Referring to FIG. 16, when atmospheric pressure is present within the first bladder 90, the at least one upper arm supports 416A, 416B are biased to the stowed position, flat against the seat back 14, as shown in FIG. 14. Referring to FIG. 17, when negative pressure is applied within the first bladder 90, the first bladder 90 compresses the architectural tiles 92, as shown by arrows 94 and the architectural tiles 92 are forced into engagement with one another, as indicated by arrows 96, and the at least one upper arm support 416 is forced laterally outward to the extended position, as shown in FIG. 15. Each of the plurality of architectural tiles 92 includes angled side-walls 98, such that when the plurality of architectural tiles 92 are forced into engagement with one another, as indicated by arrows 96, the at least one upper arm support 416 takes a curved shape, as shown in FIG. 15 and FIG. 16.

Referring to FIG. 16, in an exemplary embodiment, the at least one upper arm support 416 further includes a second bladder 100. When positive pressure is applied within the second bladder 100, as indicated by arrows 102, the second bladder 100 biases the at least one upper arm support 416 to the stowed position. Referring to FIG. 17, when negative pressure is applied to the first bladder 90 and pressure is released from the second bladder 100, the first bladder 90 compresses the architectural tiles 92, as shown by arrows 94, and the architectural tiles 92 are forced into engagement with one another, as indicated by arrows 96, and the at least one upper arm support 416 is forced laterally outward to the extended position, as shown in FIG. 15. By carefully controlling the counter-acting forces of negative pressure within the first bladder 90 and positive pressure within the second bladder 100, the profile and stiffness of the at least one upper arm support 416 can be tailored to occupant preferences.

Figures 18, 19:
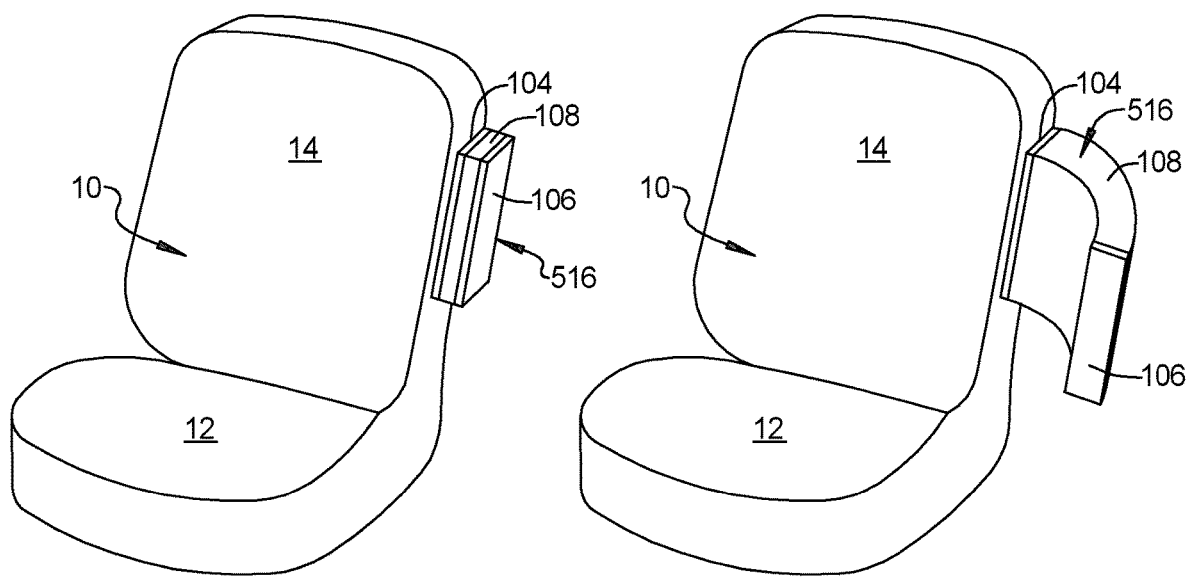
FIG. 18 is a perspective view of a vehicle seat having an upper arm support that includes first and second rigid ends and an expandable bladder extending therebetween, wherein the upper arm support is in the stowed position.
FIG. 19 is a perspective view of the vehicle seat shown in FIG. 18, wherein the upper arm support is in the extended position.
Figure 20:
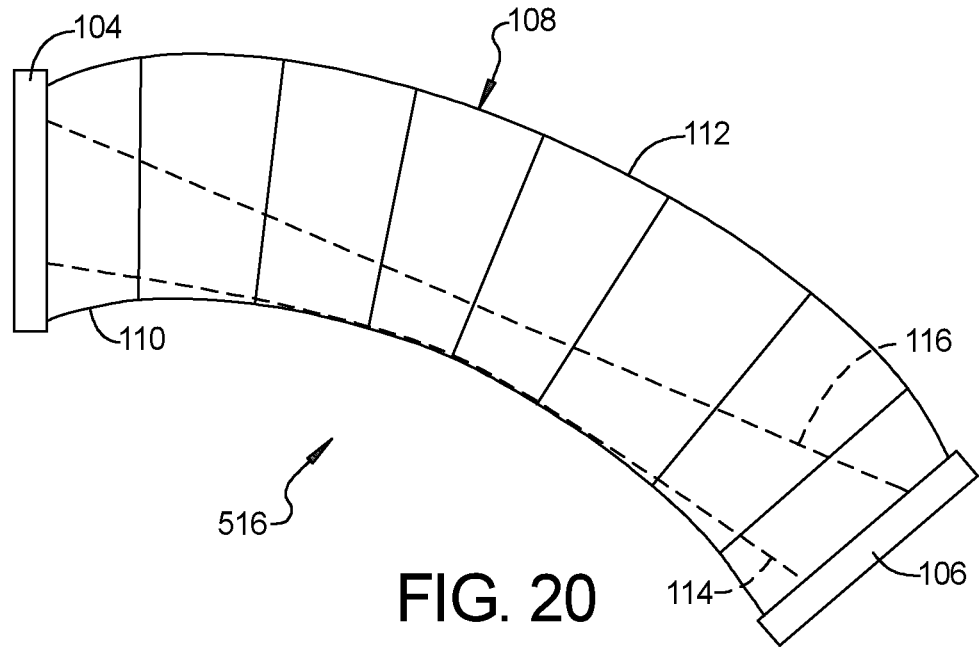
FIG. 20 is a top view of the upper arm support shown in FIG. 19.
Figure 21:
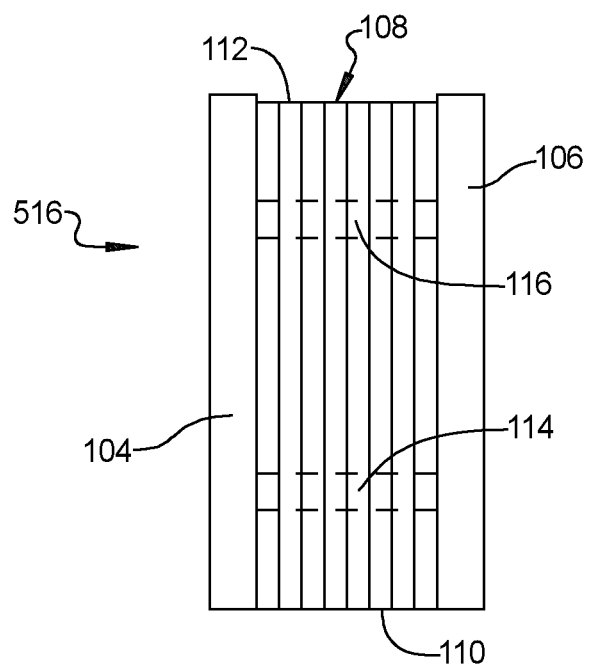
FIG. 21 is a top view of the upper arm support shown in FIG. 18.

Referring to FIG. 18, FIG. 19, FIG. 20 and FIG. 21, in another exemplary embodiment, an at least one upper arm support 516 includes a first rigid end 104 mounted to the seat back 14, a second rigid end 106, and an expandable bladder 108 extending between the first and second rigid ends 104, 106. Referring to FIG. 18 and FIG. 21, when the at least one upper arm support 516 is in the stowed position, no pressure is applied within the expandable bladder 108, and the bladder 108 is compressed between the first and second rigid ends 104, 106. Referring to FIG. 19 and FIG. 20, when the at least one upper arm support 516 is in the extended position, positive pressure is applied within the expandable bladder 108, expanding the expandable bladder 108 and pushing the second rigid end 106 laterally outward.

Referring to FIG. 20, in an exemplary embodiment, the expandable bladder 108 includes a stretchable first side wall 110 and a stretchable second side wall 112, opposite the first side wall 110. The second side wall 112 has a maximum length that is longer than the first side wall 110. In one variation, the second side wall 112 is able to stretch more than the first side wall 110, and thus, able to extend outward to a longer maximum length than the first side wall 110. When the expandable bladder 108 is fully expanded, a maximum length of the second side wall 112 is longer than a maximum length of the first side wall 110, and the at least one upper arm support 516 is forced to curve forward, thus providing lateral support for the upper arm 18 of the occupant 20 when the seat back 14 of the vehicle seat 10 is in a reclined position and restrict movement of the upper arm 18 of the occupant 20 laterally away from the occupant 20. In an alternative variation, the first and second side walls 110, 112 are not stretchable, and each have a fixed maximum length, wherein the maximum length of the second side wall 112 is longer than the maximum length of the first side wall 110, causing the final shape of the at least one upper arm support 516 to curve forward.

In another exemplary embodiment, the expandable bladder 108 includes a first elastic tether 114 extending between the first and second rigid ends 104, 106 adjacent the first side wall 110 and a second elastic tether 116 extending between the first and second rigid ends 104, 106 adjacent the second side wall 112. The second elastic tether 116 is adapted to allow more expansion of the expandable bladder 108 than the first elastic tether 114. As pressure is increased within the expandable bladder 108, the expandable bladder 108 will extend laterally outward in a substantially straight manner. The first elastic tether 114 will reach a point where the first elastic tether 114 cannot expand further, but the second elastic tether 116 can expand further. From this point, additional increased pressure within the expandable bladder 108 will cause the at least one upper arm support 516 to curl forward, as shown in FIG. 20, wherein the at least one upper arm support 516 will provide lateral support for the upper arm 18 of the occupant 20 when the seat back 14 of the vehicle seat 10 is in a reclined position and restrict movement of the upper arm 18 of the occupant 20 laterally away from the occupant 20.

Referring to FIG. 21, when no pressure is applied within the expandable bladder 108, the first and second elastic tethers 114, 116 are adapted to pull the second rigid end 106 toward the first rigid end 104 and compress the expandable bladder 108, bringing the at least one upper arm support 516 to the stowed position. As shown in FIG. 18, the at least one upper arm support 516, including the first and second rigid ends 104, 106 and the expandable bladder 108 are mounted externally onto the seat back 14. In an alternative embodiment, the at least one upper arm support 516, including the first and second rigid ends 104, 106 and the expandable bladder 108, are positioned within a pocket, such that the at least one upper arm support 516, including the first and second rigid ends 104, 106 and the bladder 108 are recessed within the seat back 14, and when the at least one upper arm support 516 is in the stowed position, the second rigid end 106 will be flush with an exterior surface of the seat back 14 to provide a more cosmetic appearance.

A vehicle seat of the present disclosure offers several advantages. These include providing both vertical and lateral support for the upper arm of an occupant when the vehicle seat 10 is in the reclined position, as well as providing some additional support when there is a collision event.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle seat, comprising:
a seat cushion including at least one attachment point;
a seat back pivotally moveable between an upright position and a reclined position; and
at least one upper arm support selectively moveable between a stowed position and an extended position, wherein the at least one upper arm support includes a stretchable band configured to recoil within the seat back onto a spool when in the stowed position and including a rigid member positioned at a distal end of the stretchable band, the rigid member configured to be secured to the at least one attachment point when the at least one upper arm support is pulled to the extended position, the at least one upper arm support adapted to provide support for an upper arm of an occupant when the seat back of the vehicle seat is in the reclined position and the at least one upper arm support is in the extended position.

2. The vehicle seat of claim 1, wherein the at least one upper arm support is mounted onto the seat back and is adapted to extend, from the stowed position, laterally outward from the seat back, to the extended position, to provide vertical support for the upper arm of the occupant when the seat back of the vehicle seat is in the reclined position.

3. The vehicle seat of claim 2, wherein the at least one upper arm support includes a first upper arm support positioned on the seat back on a first side of the vehicle seat and a second upper arm support positioned on the seat back on a second side of the vehicle seat.

4. The vehicle seat of claim 2, wherein the at least one upper arm support is further adapted to provide lateral support for the upper arm of the occupant when the seat back of the vehicle seat is in a reclined position and restrict movement of the upper arm of the occupant laterally away from the occupant.

5. The vehicle seat of claim 1, wherein the spool is adapted to allow the stretchable band to be selectively pulled from the seat back to the extended position and to prevent further extension of the stretchable band during a collision event.

6. The vehicle seat of claim 1, wherein the at least one upper arm support extends from the seat back on a first side of the vehicle seat, and the attachment point is positioned on the seat cushion on a second side of the vehicle seat, wherein when in the extended position, the stretchable band extends across an occupant seated therein.

7. The vehicle seat of claim 1, wherein the at least one upper arm support extends from the seat back on a first side of the vehicle seat, and the attachment point is positioned on a top surface of the seat cushion, wherein when in the extended position, the stretchable band extends partially across an occupant seated therein.

* * * * *